United States Patent
Dong et al.

(10) Patent No.: US 9,794,588 B2
(45) Date of Patent: Oct. 17, 2017

(54) IMAGE PROCESSING SYSTEM WITH OPTICAL FLOW RECOVERY MECHANISM AND METHOD OF OPERATION THEREOF

(71) Applicant: Sony Corporation, Tokyo (JP)

(72) Inventors: Xiaogang Dong, Boyds, MD (US); Jiro Takatori, Tokyo (JP); Tak-Shing Wong, Pleasanton, CA (US)

(73) Assignee: Sony Corporation, Tokyo (JP)

( * ) Notice: Subject to any disclaimer, the term of this patent is extended or adjusted under 35 U.S.C. 154(b) by 251 days.

(21) Appl. No.: 14/871,806

(22) Filed: Sep. 30, 2015

(65) Prior Publication Data
US 2017/0094310 A1    Mar. 30, 2017

(51) Int. Cl.
*H04N 19/513* (2014.01)
*H04N 19/573* (2014.01)

(52) U.S. Cl.
CPC ......... *H04N 19/521* (2014.11); *H04N 19/573* (2014.11)

(58) Field of Classification Search
CPC .................... H04N 19/521; H04N 19/573
See application file for complete search history.

(56) References Cited

U.S. PATENT DOCUMENTS

| | | |
|---|---|---|
| 6,011,596 A | 1/2000 | Burl et al. |
| 6,192,156 B1 | 2/2001 | Moorby |
| 8,422,741 B2 | 4/2013 | Eggert et al. |
| 8,831,105 B2 | 9/2014 | Lee et al. |
| 2014/0049607 A1 | 2/2014 | Amon et al. |

OTHER PUBLICATIONS

Horn et al., "Determining Optical Flow", "Artificial Intelligence", 1981, pp. 185-203, vol. 17, Artificial Intelligence Laboratory, MIT, Cambridge, MA.

*Primary Examiner* — Jonathan Messmore
(74) *Attorney, Agent, or Firm* — Haverstock & Owens LLP

(57) ABSTRACT

An image processing system, and a method of operation thereof, includes: an edge motion generation unit for detecting edges in a first image frame and a second image frame stored by a storage device or a memory and for generating edge motion vectors between the first image frame and the second image frame based on the edges; a motion vector list generation unit for extracting dominant motion vectors from a group of the edge motion vectors and for generating a motion vector list based on the dominant motion vectors; an image segmentation unit for generating a segmentation of the first image frame; an initial motion generation unit for generating initial motion vectors based on the segmentation and the motion vector list; and a smooth motion generation unit for generating smooth motion vectors based on the initial motion vectors and for generating a dense optical flow field by combining the smooth motion vectors.

20 Claims, 9 Drawing Sheets

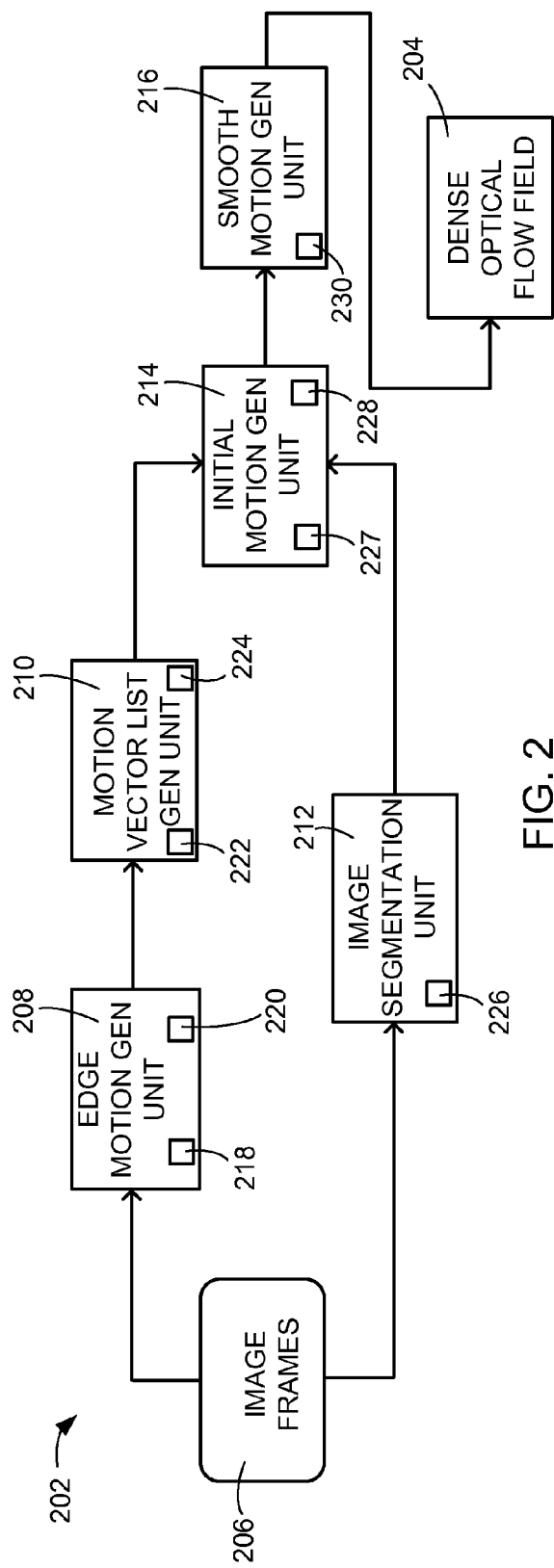
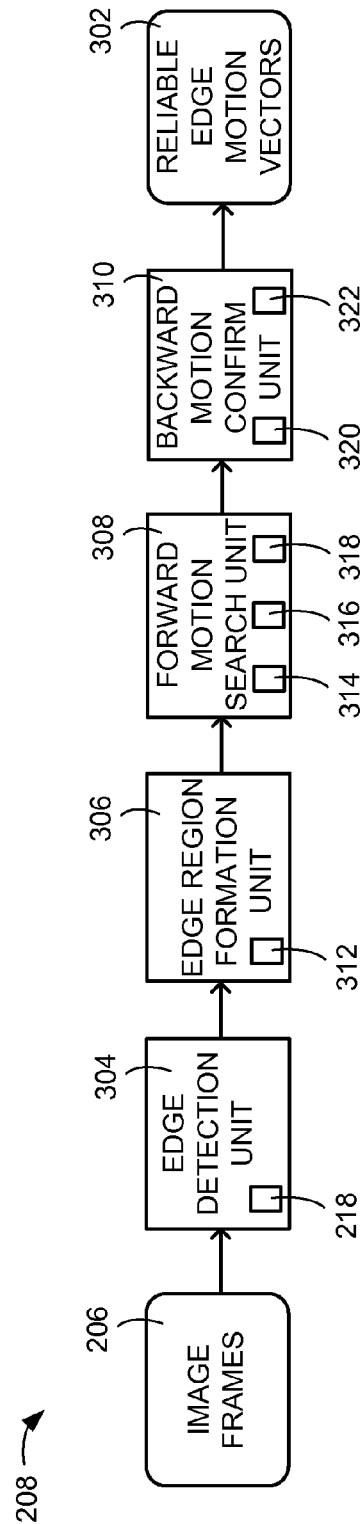
FIG. 2
FIG. 3 ent of FIG. 2.

IMAGE PROCESSING SYSTEM WITH OPTICAL FLOW RECOVERY MECHANISM AND METHOD OF OPERATION THEREOF

TECHNICAL FIELD

The present invention relates generally to an image processing system and more particularly to a system for image processing with optical flow.

BACKGROUND ART

In computer vision and image processing, an optical flow refers to measurements of moving objects between two consecutive image frames from a video sequence or a disparity between stereo pairs of images. Optical flow technologies are generally divided into two categories: sparse optical flow technologies and dense optical flow technologies.

Sparse optical flow technologies only provide motion vectors at particular locations of the image frames. These locations are often referred as "feature points". Various feature point detection (or extraction) algorithms, such as Harris corner detector, difference of Gaussian, and determinant of Hessian matrix, can be used to determine the feature points. Each motion vector is a motion displacement between the feature points in one image frame and its corresponding position in the other image frame. Examples of feature-based sparse optical flow algorithms include Kanade-Lucas tracker (KLT), Scale Invariant Feature Transform (SIFT), Speed-Up Robust Features (SURF), Features from accelerated segment test (FAST), etc. Sparse optical algorithms' advantage is computation efficiency. However, a problem that they have is that they do not work as well as dense optical flow algorithms in many applications listed below.

Another of the categories of the optical flow technologies is the dense optical flow, which provides motion vectors at every pixel location in the image frames. The dense optical flow is very useful in many applications including, but not limited to, video denoising, video compression, object detection and tracking, motion segmentation, robotic navigation, or stereo disparity measurement.

For a dense optical flow computation, one of the optical flow algorithms is developed by Horn and Schunck. The algorithm developed by Horn and Schunck tries to optimize an objective function based on residuals from a brightness constancy constraint, and a particular regularization term expressing an expected smoothness of an optical flow field. Based on Horn and Schunck's general framework, many improvements have been made. However, one of the major disadvantages of Horn and Schunck's algorithm and similar algorithms is a problem of high computation complexity.

There are also existing so-called fast algorithms, such as Farnback, SimpleFlow, and DualTV L1. However, these algorithms have problems because the quality of a generated flow field is generally not satisfying and some of them may be even slower than the algorithm developed by Horn and Schunck. These algorithms are so-called fast because some of them are not very fast as pointed out below. Thus, there is a need for fast and high quality dense optical flow algorithms.

The embodiments subsequently describe the fast and high quality dense optical flow algorithms that solve the problems above by providing not only a less computation-intensive algorithm than those developed by Horn and Schunck but also a higher quality for optical flow field compared to the existing fast algorithms. Solutions to such problems have been long sought but prior developments have not taught or suggested any solutions and, thus, solutions to these problems have long eluded those skilled in the art.

DISCLOSURE OF THE INVENTION

Embodiments of the present invention provide a method of operation of an image processing system including: detecting edges in a first image frame and a second image frame stored by a storage device or a memory; generating edge motion vectors between the first image frame and the second image frame based on the edges; extracting dominant motion vectors from a group of the edge motion vectors; generating a motion vector list based on the dominant motion vectors; generating a segmentation of the first image frame; generating initial motion vectors based on the segmentation and the motion vector list; generating smooth motion vectors based on the initial motion vectors; and generating a dense optical flow field by combining the smooth motion vectors.

The embodiments of the present invention provide an image processing system, including: an edge motion generation unit for detecting edges in a first image frame and a second image frame stored by a storage device or a memory and for generating edge motion vectors between the first image frame and the second image frame based on the edges; a motion vector list generation unit for extracting dominant motion vectors from a group of the edge motion vectors and for generating a motion vector list based on the dominant motion vectors; an image segmentation unit for generating a segmentation of the first image frame; an initial motion generation unit for generating initial motion vectors based on the segmentation and the motion vector list; and a smooth motion generation unit for generating smooth motion vectors based on the initial motion vectors and for generating a dense optical flow field by combining the smooth motion vectors.

Certain embodiments of the invention have other steps or elements in addition to or in place of those mentioned above. The steps or the elements will become apparent to those skilled in the art from a reading of the following detailed description when taken with reference to the accompanying drawings.

BRIEF DESCRIPTION OF THE DRAWINGS

FIG. 2 is an example block diagram of a dense optical flow recovery component in the image processing system of FIG. 1.

FIG. 3 is a detailed block diagram of the edge motion generation unit in the dense optical flow recovery component of FIG. 2.

BEST MODE FOR CARRYING OUT THE INVENTION

Figure 1:
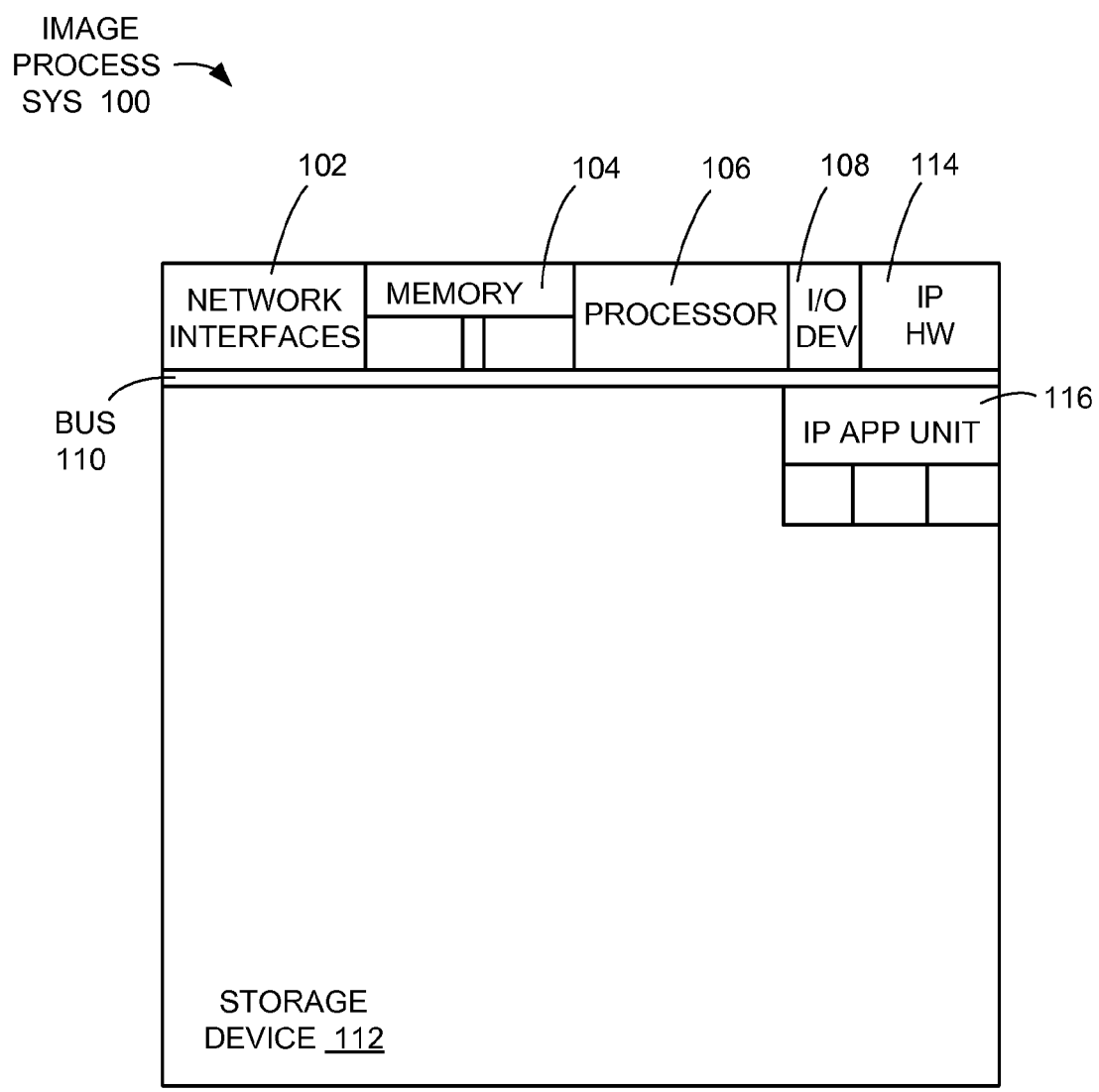
FIG. 1 is an example of a block diagram of an image processing system with an optical flow recovery mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the embodiments of the present invention.

The term "module" referred to herein can include software, hardware, or a combination thereof in the embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown an example of a block diagram of an image processing system 100 with an optical flow recovery mechanism in an embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and a flash memory card. The storage device 112 and the memory 104 can be used to store data to be processed by any of the units in the image processing system 100.

The image processing system 100 can include functions for image processing of the images and the videos. The image processing functions can be implemented with hardware, software, or any combination thereof. The image processing system 100 can include an image processing hardware 114 and an image processing application unit 116.

The image processing hardware 114 can include any hardware units including a circuitry, a processor, an integrated circuit, and integrated circuit cores. The image processing application unit 116 can include software including machine code, firmware, embedded code, and application software.

For example, a dense optical flow recovery function of the image processing system 100 can be implemented in the image processing hardware 114, in the image processing application unit 116, or in a combination thereof. Methods and systems described herein can also be applied to other computer vision, machine learning, and image restoration applications including super-resolution, in-painting, texture synthesis, segmentation, and object/scene/texture categorization.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a digital camera, a digital camcorder, a camera phone, a multimedia player, a video player, a DVD writer/player, a television, a home entertainment system, or any other computing devices. As a specific example, the computing devices can include Point-and-shoot cameras, video camcorders, single-lens reflex (SLR) cameras, mirrorless cameras, and cameras in mobile devices.

Referring now to FIG. 2, therein is shown an example block diagram of a dense optical flow recovery component 202 in the image processing system 100 of FIG. 1. The dense optical flow recovery component 202 performs the dense optical flow recovery function described above in FIG. 1.

The block diagram depicts a proposed efficient algorithm to recover a dense optical flow field 204 between two image frames 206. For example, the two of the image frames 206 are referred as a first image frame and a second image frame. The image frames 206 can be stored by the storage device 112 of FIG. 1 or the memory 104 of FIG. 1 and processed by the image processing hardware 114 of FIG. 1, the image processing application unit 116 of FIG. 1, or a combination thereof. For example, in most cameras, image data of the image frames 206 can be stored in the memory 104 after the image data are captured.

The dense optical flow recovery component 202 in the image processing system 100 includes the image frames 206, an edge motion generation unit 208, a motion vector list generation unit 210, an image segmentation unit 212, an initial motion generation unit 214, and a smooth motion generation unit 216. The edge motion generation unit 208 detects edges 218 in the image frames 206. Edge motion vectors 220 are generated between the image frames 206 by matching or comparing the edges 218 of the first image frame to the edges 218 of the second image frame.

After all the edge motion vectors 220 are generated, the motion vector list generation unit 210 can process the edge motion vectors 220 and divide them into groups of the edge motion vectors 220. The groups of the edge motion vectors 220 can include a number of the edge motion vectors 220 corresponding to the same foreground or background object motion such as, but not limited to, translations, rotations, zoomings, and tilting. Motion vectors extracted from the groups of the edge motion vectors 220 are called dominant motion vectors 222. A number of the dominant motion vectors 222 can form a motion vector list 224.

The term "foreground object" refers to an object of interest or a change in a scene. The term "background object" refers to any other objects or everything else in the scene. For example, in an image sequence of a video conference of a person speaking in a room, foreground objects can include a face of the person, and background objects can include the room or the rest of the room appeared on a screen. Also for example, in a video of cars moving through a street, foreground objects can include the moving cars, and background objects can include other objects on the street.

Then, as shown in the bottom of FIG. 2, the image segmentation unit 212 divides the image frames 206 into image segments 226. Each of the image segments 226 can include a group of connected pixels generally possessing similar properties, such as luminance level, color, textures, etc. A number of different image segmentation algorithms can be used in the image segmentation unit 212. An actual selection of the image segmentation algorithms can depend on computational complexity and segmentation accuracy. For example, simple luminance-based segmentation techniques can be used for faster calculations. Also for example, more sophisticated image segmentation techniques can be used for improved accuracy.

The initial motion generation unit 214 can determine an initial motion 227 for the image segments 226. For each of the image segments 226 in the first image frame, the initial motion generation unit 214 can assign one particular dominant motion vector 222 from the motion vector list 224 to each of the image segments 226. Such an assignment corresponds to the most likely movement of each of the image segments 226 in the first image frame. Since an initial motion vector 228 can be optimized for each individual image segment 226, obtained optical flow fields are generally not very smooth. In order to obtain a smooth optical flow field, the smooth motion generation unit 216 can be applied to initial motion vectors 228 to generate corresponding smooth motion vectors 230. A final optical flow field or the dense optical flow field 204 can be obtained by combining all of the smooth motion vectors 230. The units above will subsequently be described in more details.

Each individual unit in FIG. 2, such as the edge motion generation unit 208, the motion vector list generation unit 210, the image segmentation unit 212, the initial motion generation unit 214, or the smooth motion generation unit 216, can be implemented in the image processing hardware 114, in the image processing application unit 116, or in a combination thereof. The edge motion generation unit 208 can be coupled to the motion vector list generation unit 210. The motion vector list generation unit 210 and the image segmentation unit 212 can be coupled to the initial motion generation unit 214. The initial motion generation unit 214 can be coupled to the smooth motion generation unit 216. The smooth motion generation unit 216 outputs the dense optical flow field 204.

It has been found that the embodiments develop a fast dense optical flow algorithm to recover a smooth and relatively accurate optical flow field or the dense optical flow field 204. The fast dense optical flow algorithm is improved over some existing approaches that are getting reasonably smooth motion fields that are very slow and over some existing faster approaches that are getting very low quality motion fields.

Referring now to FIG. 3, therein is shown a detailed block diagram of the edge motion generation unit 208 in the dense optical flow recovery component 202 of FIG. 2. The detailed block diagram depicts an algorithm for generating reliable edge motion vectors 302.

The edge motion generation unit 208 uses the image frames 206 as an input. The edge motion generation unit 208 includes an edge detection unit 304, an edge region formation unit 306, a forward motion search unit 308, and a backward motion confirmation unit 310. Finally, the reliable edge motion vectors 302 are generated as an output of the backward motion confirmation unit 310 in the edge motion generation unit 208.

The edge detection unit 304 can be implemented using a variety of edge detectors including, but not limited to, Canny and Sobel edge detectors, to generate the edges 218. Edge regions 312 are formed in the first image frame by the edge region formation unit 306 after edge detection is performed by the edge detection unit 304. After the edge regions 312 in the first image frame are generated, a forward motion search 314 in the second image frame is performed by the forward motion search unit 308 to find or detect a most similar region 316 in the second image frame for each of the edge regions 312. Various similarity metrics including, but not limited to, sum of squared differences and sum of absolute differences can be used to determine the most similar region 316. A motion vector from an edge region 312 in the first image frame to the most similar region 316 in the second image frame is a forward motion vector 318.

After the forward motion search 314, a number of unreliable forward motion vectors 320 can exist. In other words, the unreliable forward motion vectors 320 can give incorrect motions with high probabilities. As such, a backward motion search 322 of the backward motion confirmation unit 310 is performed for the most similar region 316 in the second image frame in order to determine that the edge motion vectors 220 of FIG. 2 generated in the forward motion search 314 is reliable and to eliminate the unreliable forward motion vectors 320.

The term "backward motion confirmation" is a pruning technique employed to eliminate false detection of motions. Any other false motion pruning techniques can replace the backward motion confirmation used in the backward motion confirmation unit 310. The details of the backward motion confirmation will subsequently be described in FIG. 4.

Each individual unit in FIG. 3, such as the edge detection unit 304, the edge region formation unit 306, the forward motion search unit 308, and the backward motion confirmation unit 310, can be implemented in the image processing hardware 114 of FIG. 1, in the image processing application unit 116 of FIG. 1, or in a combination thereof. The edge detection unit 304 can be coupled to the edge region formation unit 306. The edge region formation unit 306 can be coupled to the forward motion search unit 308. The forward motion search unit 308 can be coupled to the backward motion confirmation unit 310.

Figure 4:
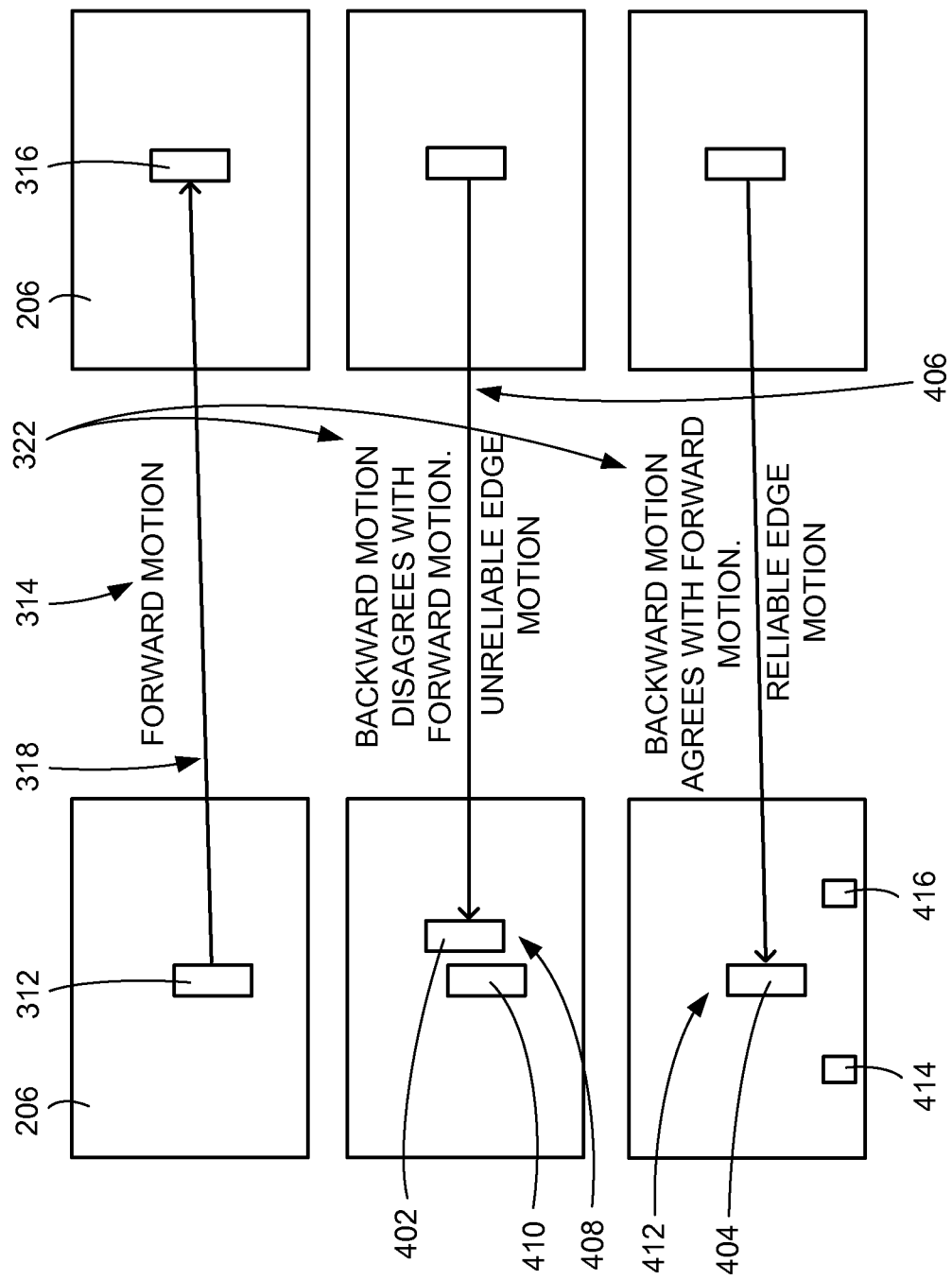
FIG. 4 is an example diagram depicting the forward motion search and the backward motion search used in the edge motion generation unit of FIG. 2.

Referring now to FIG. 4, therein is shown an example diagram depicting the forward motion search 314 and the backward motion search 322 used in the edge motion generation unit 208 of FIG. 2. The most similar region 316 is detected in a next frame or the second image frame as most similarly to one of the edge regions 312 in a current frame or the first image frame using the forward motion search 314.

For example, sums of squared differences between the edge region 312 in the first frame and every possible candidate region for the most similar region 316 in the second frame can be calculated. A candidate region with the smallest sum of the squared differences can be selected as the most similar region 316. A motion vector from the edge region 312 in the first image frame to the most similar region 316 in the second image frame is the forward motion vector 318.

The first image frame is examined to find or detect a backward similar region 402 that is most similarly to the most similar region 316 of the second image frame using or by the backward motion search 322. A technique used in the backward motion search 322 can be identical to these used in the forward motion search 314.

For example, sums of squared differences between the most similar region 316 in the second frame and every possible candidate region for a backward most similar region 404 in the first frame can be calculated for the backward motion search 322. The candidate region with the smallest sum of the squared differences can be selected as the backward most similar region 404 in the first frame. A motion from the most similar region 316 in the second image frame to the backward most similar region 404 in the first image frame is a backward motion 406.

When search results of the forward motion search 314 and the backward motion search 322 disagree, an unreliable edge motion 408 is detected. In other words, the unreliable edge motion 408 is detected when an original edge region 410 and the backward most similar region 404 of the most similar region 316 do not match each other. Forward motion vectors 318 of the edge regions 312 of the image frames 206 are removed or ignored when the unreliable edge motion 408 of one of the edge regions 312 is detected.

When the search results of the forward motion search 314 and the backward motion search 322 agree, a reliable edge motion 412 is detected. In other words, the reliable edge motion 412 is detected when the original edge region 410 and the backward most similar region 404 of the most similar region 316 match each other. The original edge region 410 and the backward most similar region 404 match each other when the two regions possess the same group of pixels in the first image frame.

Sometimes, the above approach can also remove some of the forward motion vectors 318 that give the correct motion. Therefore, alternatively, a percentage of common pixels between the original edge region 410 and the backward most similar region 404 can be calculated. A threshold 414 can also be pre-selected. When the percentage of the common pixels is less than the pre-selected threshold 414, the corresponding forward motion vector 318 from the original edge region 410 in the first frame to the most similar region 316 in the second frame is unreliable. When the percentage of the common pixels is larger than the pre-selected threshold 414, the corresponding forward motion vector 318 is reliable.

A search window 416 for detecting the most similar region 316 or the backward most similar region 404 can be of any size. In order to expedite the searching processes, the search window 416 of a limited or pre-determined size is often used. However, the search window 416 can be as large as one of the image frames 206 if necessary.

In the simplest implementation, the edge motion vectors 220 of FIG. 2 can include only two values including a horizontal displacement and a vertical displacement. However, a two-value motion vector can only handle translational movements. As an extension to the edge motion vectors 220 to further address more complicated motions, such as rotation and zooming, with a number of values greater than two can be used in the edge motion vectors 220 to model these movements.

Figure 5:
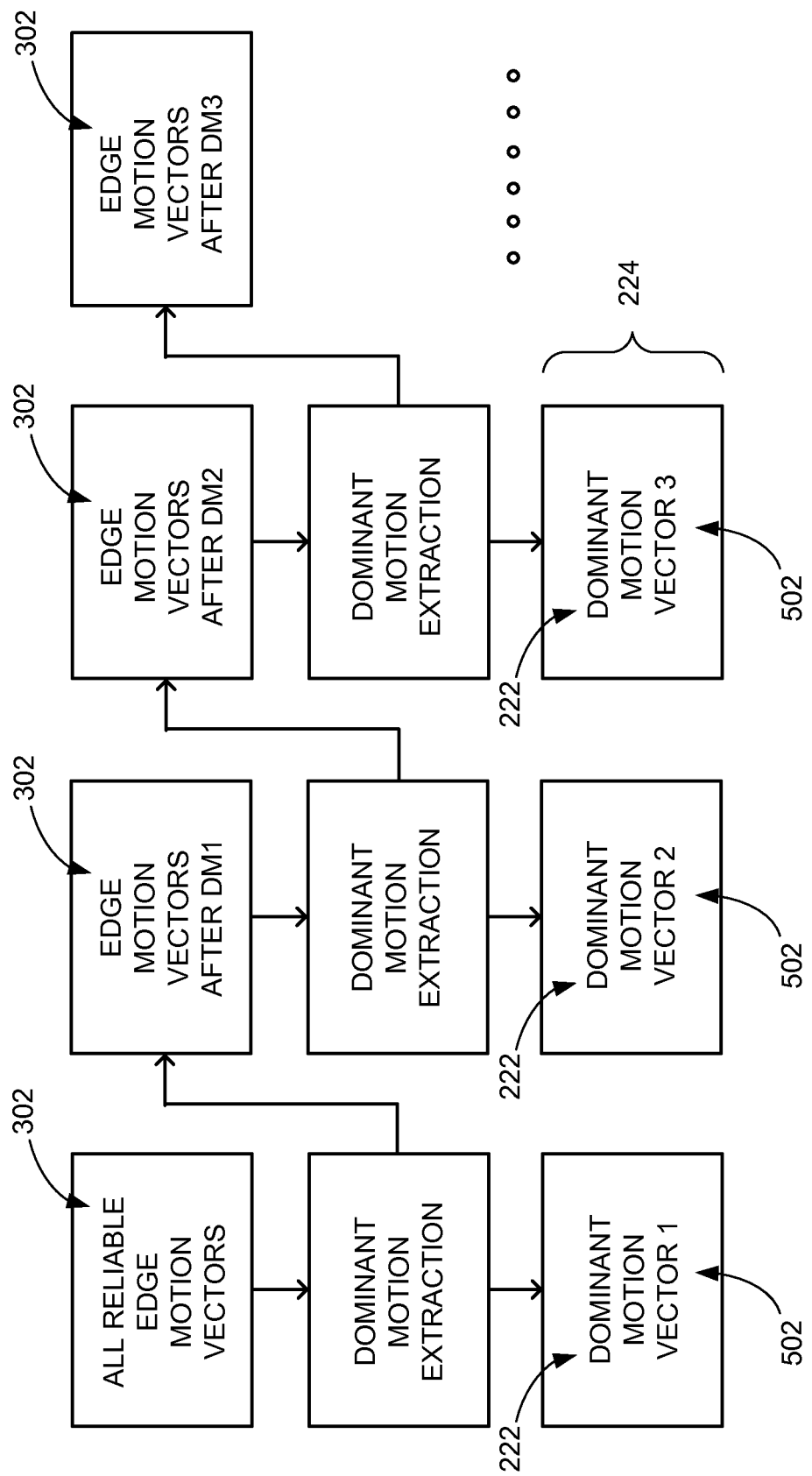
FIG. 5 is a detailed block diagram illustrating a method of generating the motion vector list.

Referring now to FIG. 5, therein is shown a detailed block diagram illustrating a method of generating the motion vector list 224. Between the two of the image frames 206 of FIG. 2, there are generally a number of different foreground or background object motions. Each foreground or background object motion can correspond to a group of reliable edge motions 412 of FIG. 4. Therefore, all of the reliable edge motions 412 can be partitioned into different groups and each group would correspond to a foreground or background object motion between the image frames 206.

For example, 40% of the reliable edge motions 412 can correspond to a camera rotation motion. In this case, all background objects can rotate by certain degrees. Also for example, 30% of the reliable edge motions 412 can correspond to a translational movement of one of the foreground objects.

Among all groups of the reliable edge motion vectors 302 that correspond to different foreground or background object motions, there is one group having the largest number of the reliable edge motion vectors 302. The corresponding foreground or background object motion can be called a most dominant motion vector 502. All of the reliable edge motion vectors 302 generated from the previous steps form a first collection of the reliable edge motion vectors 302. Then, a dominant motion extraction algorithm can be applied to the first collection of the reliable edge motion vectors 302 to extract one of the dominant motion vectors 222, such as the dominant motion vector 1.

All of the reliable edge motion vectors 302 minus the reliable edge motion vectors 302 that correspond to one of the dominant motion vectors 222, such as the dominant motion vector 1, can form a second collection of the reliable edge motion vectors 302. Then, the dominant motion extraction algorithm can be applied to the second collection of the reliable edge motion vectors 302 to extract the most dominant motion vector 502 in the second collection, denoted as the dominant motion vector 2.

All of the reliable edge motion vectors 302 minus the reliable edge motion vectors 302 that correspond to the dominant motion vector 1 and the dominant motion vector 2 can form a third collection of the reliable edge motion vectors 302. Then, the dominant motion extraction algorithm can be applied to the third collection of the reliable edge motion vectors 302 to extract the most dominant motion vector 502 in the third collection, denoted as the dominant motion vector 3. The similar procedure can be repeated a number of times until a desired or pre-determined number of the dominant motion vectors 222 are obtained.

Many different clustering algorithms can be used as the dominant motion extraction algorithm. Random sample consensus (RANSAC) is a popular clustering algorithm to extract the dominant motion. Other histogram-based clustering algorithms are often used as well. The same clustering algorithm can be applied to all collections of the reliable edge motions 412 to extract a number of dominant motions. Alternatively, different clustering algorithms can be applied to different collections of the reliable edge motions 412 to extract the dominant motions.

For example, RANSAC can be applied to all collections of the reliable edge motions 412 to extract a number of the dominant motions. Also for example, RANSAC can be applied to extract a dominant motion 1 and some other histogram-based clustering algorithms can be applied to extract the dominant motions 2, 3, and so on.

After a desired or pre-determined number of the dominant motion vectors 222 are extracted from the reliable edge motion vectors 302, the dominant motion vectors 222 can form the motion vector list 224. Instead of using the reliable edge motion vectors 302, the motion vector list 224 can be generated from other types of reliable motion vectors. For example, a number of feature-based sparse optical flow algorithms, such as KLT, SIFT, SURF, FAST, etc. can be used to generate a collection of the reliable motion vectors that correspond to movements of the feature points. The motion vector list 224 can be generated by extracting the dominant motion vectors 222 from the collection of feature-point based reliable motion vectors.

In the simplest implementation, the dominant motion vectors 222 can include only two values including a horizontal displacement and a vertical displacement. However, a two-value motion vector can only handle translational movements of foreground or background objects.

As an extension to the dominant motion vectors 222 to further address more complicated foreground or background object movements, such as rotation, zooming, tilting, and movements caused by perspective changes, with a number of values greater than 2 can be used in the dominant motion vectors 222 to model these foreground or background object movements.

It has been found that the dominant motion vectors 222 with a number of the values greater than 2 to further address more motions beyond the translational movements and improve quality with more computation time.

Figure 6:
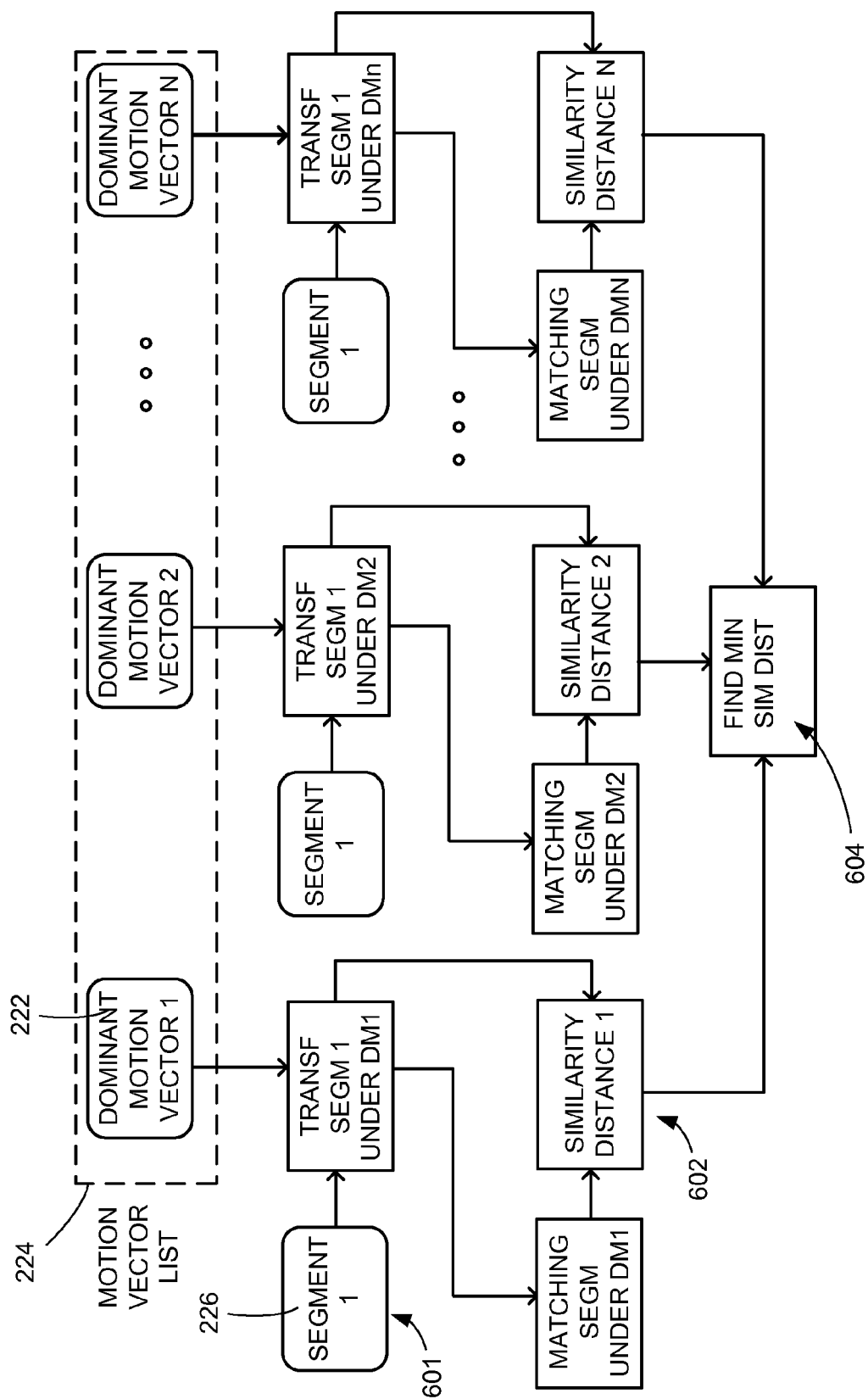
FIG. 6 is a detailed block diagram illustrating a method of generating the initial motion of FIG. 2.

Referring now to FIG. 6, therein is shown a detailed block diagram illustrating a method of generating the initial motion 227 of FIG. 2. After frame segmentations 601 of the image segments 226 in the first image frame are generated by the image segmentation unit 212 of FIG. 2, the image segments 226 can be transformed by each of the dominant motion vectors 222 in the motion vector list 224. For illustrative purposes, the detailed block diagram depicts transformation of one of the image segments 226, denoted as segment 1, by the motion vector list 224 of the dominant motion vectors 222, such as the dominant motion vector 1, the dominant motion vector 2, . . . , and the dominant motion vector n, denoted as DM1, DM2, . . . , and DMn, respectively.

The dominant motion vector 1 maps the segment 1 into a new pixel location in the second image frame. The new pixel location is a group of pixels in the second image frame pointed to by the dominant motion vector 1. Meanwhile, there is a matching segment in the second image frame that shares the same group of pixel locations in the second image frame. A similarity between the transformed segment 1 under the dominant motion vector 1 and the matching segment in the second image frame can be calculated subsequently.

For example, the dominant motion 1 represents a clockwise camera rotation of ten degrees. Then, the segment 1 in the first image frame can be transformed by the clockwise camera rotation of ten degrees into a group of new pixel locations. The resulting segment at the new pixel locations is the transformed segment 1. The matching segment in the second image frame that shares the same new pixel locations in the second image frame can also be obtained or generated. A similarity distance 1 is calculated between the transformed segment 1 under the dominant motion 1 and the matching segment in the second image frame.

A transformation of the image segments 226 generates a list of similarity distances 602. Each of the similarity distances 602 corresponds to a dominant motion vector 222 in the motion vector list 224. The similarity distances 602 can be used to find or calculate a minimum similarity distance 604. The dominant motion vectors 222 associated with the minimum similarity distance 604 is assigned to the segment 1. This dominant motion vector 222 is called the initial motion vector 228 of FIG. 2 of the segment 1.

Similarly, for a given image segment 226 in the first image frame, the image segment 226 can be transformed based on each of the dominant motion vectors 222 in the motion vector list 224 to generate corresponding transformed segments and matching segments in the second image frame. Then, the similarity distances 602 between the transformed segments in the first image frame and all of the matching segments in the second image frame can be calculated. The dominant motion vectors 222 associated with a smallest similarity distance or the minimum similarity distance 604 is assigned to one of the image segments 226 in the first image frame after the comparison as the initial motions.

An optical flow field can be generated after each of the image segments 226 is assigned the initial motion vector 228. Such optical flow field is called the "initial" optical flow field. The initial optical flow field is generally "noisy". In other words, some of small background segments can be assigned to different initial motion vectors 228 other than the initial motion vector 228 that corresponds to the correct background motion. Meanwhile, some of small foreground segments can be assigned to different initial motion vectors 228 other than the initial motion vectors 228 that correspond to the correct foreground object motions. In order to obtain a more "smooth" optical flow field, a motion smoothing process can be applied. One possible approach of smoothing the optical flow motion field is subsequently described in FIG. 7 and FIG. 8.

The fast and high quality dense optical flow algorithms of the embodiments are built based on an assumption that different image segments 226 of the same moving object share the same motion vectors. The initial motion 227 can be calculated for the image segments 226 instead of individual ones of the pixels of FIG. 2.

It has been found that the initial motion 227 calculated for the image segments 226 instead of the individual ones of the pixels is key for the fast and high quality dense optical flow algorithms of the embodiments to be computationally efficient.

Figure 7:
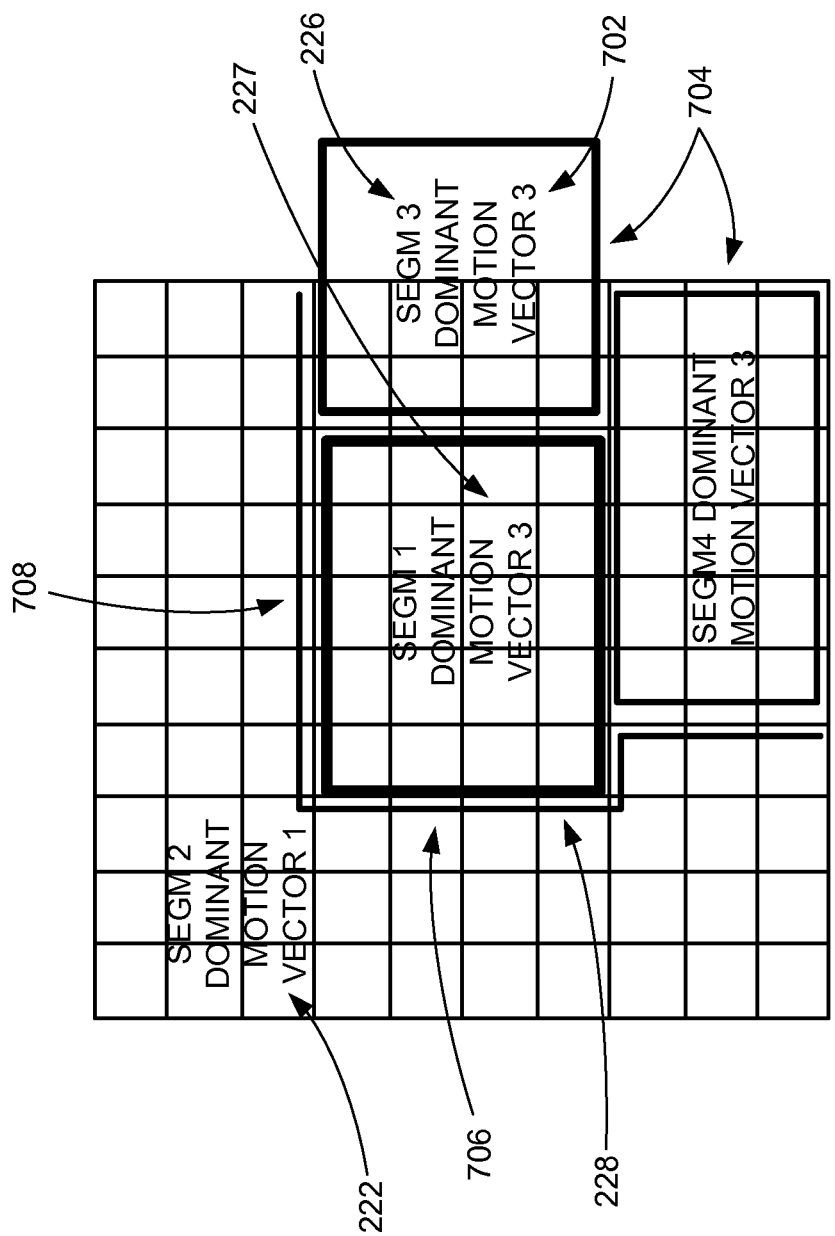
FIG. 7 is an example diagram of a calculation of a neighbor motion vector.

Referring now to FIG. 7, therein is shown an example diagram of a calculation of a neighbor motion vector 702. For illustrative purposes, the example diagram depicts a number of the dominant motion vectors 222, such as the dominant motion vector 1 and the dominant motion vector 3, associated with the image segments 226, such as segment 1, segment 2, segment 3, and segment 4.

In the example, segment 1 has the dominant motion vector 3 as the initial motion 227. Segment 1 has three neighbor segments 704, such as segments 2, 3, and 4. Segment 2's initial motion is the dominant motion vector 1. Segments 3 and 4 have the dominant motion vector 3 as the initial motion 227. The neighbor segments 704 are the image segments 226 immediately next to one of the image segments 226 for which the initial motion vector 228 is calculated.

Lengths 706 of shared boundaries 708 between two image segments 226 is determined by the number of neighboring pixel pairs between the two image segments 226 along the shared boundaries. The shared boundaries 708 are shown as straight lines or interfaces between the pixels of the image segments 226.

For example, the lengths 706 between segments 1 and 2 are 5, 4, and 1 along the three straight lines, resulting in 10 neighboring pixel pairs. Also for example, one of the lengths 706 between segments 1 and 4 is 4, and another of the lengths 706 between segments 1 and 3 is 4.

For any one of the segments in the first image frame, its neighboring segments can have different dominant motion vectors 222 as the initial motion vectors 228. The total length of the shared boundaries associated to a particular dominant motion vector 222 can be calculated as the sum of the lengths of the shared boundaries between the segment and its neighboring segments that have this dominant motion vector 222 as the initial motion vectors 228.

In the above example, a total of the lengths 706 of the shared boundaries 708 of segment 1 related to or associated with the dominant motion vector 1 is a sum of 5, 4, and 1, resulting in 10. Yet further, for example, a total of the lengths 706 of the shared boundaries 708 of segment 1 related to or associated with the dominant motion vector 3 is a sum of 4 (between segments 1 and 3) and 4 (between segments 1 and 4), resulting in 8.

One of the dominant motion vectors 222 corresponding to the longest length or the highest total of the lengths 706 of the shared boundaries 708 of a particular one of the image segments 226 is the neighbor motion vector 702. In the example, segment 1's neighbor motion is the dominant motion vector 1.

Figure 8:
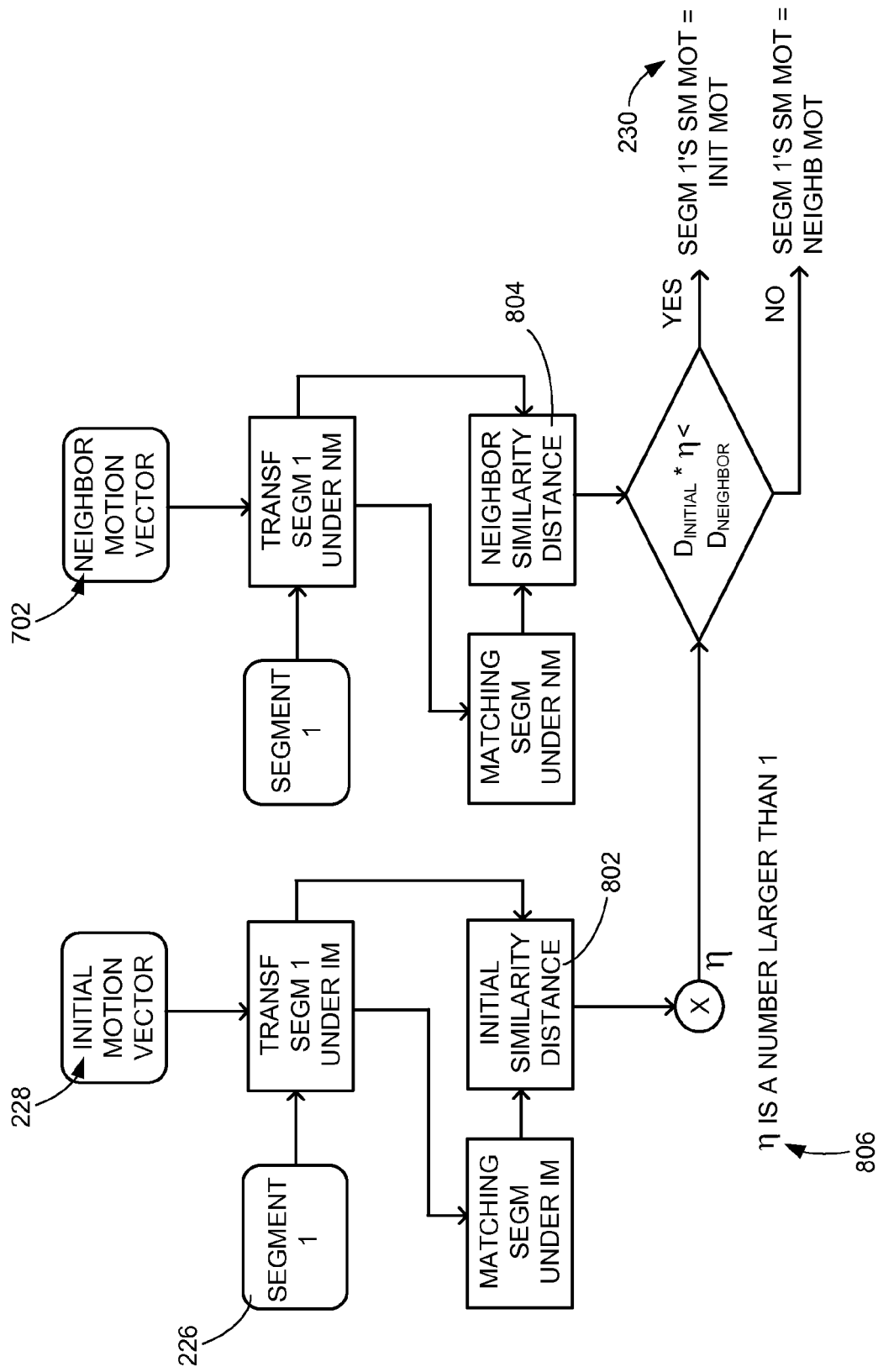
FIG. 8 is an example diagram of a calculation of the smooth motion vectors.

Referring now to FIG. 8, therein is shown an example diagram of a calculation of the smooth motion vectors 230. For illustrative purposes, the example diagram depicts an algorithm for calculating a smooth motion vector 230 of segment 1 based on the initial motion vector 228 and the neighbor motion vector 702.

Segment 1 can be transformed by the initial motion vector 228 to a group of new pixel locations. The transformed segment 1 under the initial motion vector 228 can be compared with the matching segment that shares the same group of new pixel locations in the second frame to generate an initial similarity distance 802, denoted as $D_{initial}$. This initial similarity distance 802 is identical to the minimum similarity distance 604 in FIG. 6.

Meanwhile, segment 1 can be transformed by the neighbor motion vector 702 to another group of new pixel locations. The transformed segment 1 under the neighbor motion vector 702 can be compared with the matching segment in the second image frame to generate a neighbor similarity distance 804, denoted as $D_{neighbor}$. Since the neighbor motion vector 702 is calculated from the motion vector list 224 of FIG. 2, this neighbor similarity distance 804 equals to one of the similarity distances calculated in FIG. 6, i.e., similarity distance 1 to similarity distance n. Since the initial similarity distance 802 is the minimum among the similarity distances calculated in FIG. 6, it may be never larger than the neighbor similarity distance 804.

The neighbor similarity distance 804 is compared to a product of the initial similarity distance 802 and a multiplier 806, denoted as η, which is a pre-selected number greater than 1. If $D_{initial}*\eta$ is less than $D_{neighbor}$, the initial motion vector 228 can be selected as the smooth motion vector 230. Otherwise, if $D_{initial}*\eta$ is greater than or equal to $D_{neighbor}$, the neighbor motion vector 702 can be selected as the smooth motion vector 230.

After the smooth motion vector 230 is selected for each of the image segments 226, the final optical flow field can be obtained by combining all the smooth motion vectors 230. This optical flow field is generally smoother than the initial optical flow field. Therefore, it is also called the "smooth" optical flow field.

A value for the multiplier 806 η is determined based on a tradeoff between how smooth the final optical flow motion field is and how accurate the optical flow motion field is along the object boundaries. If the value of the multiplier 806 η is very large, neighbor motion vectors 702 are more likely selected as the smooth motion vectors 230 for the image segments 226. In this case, the final optical flow fields are smoother, but the boundaries of moving objects cannot be accurately reflected in the final optical flow field. If the multiplier 806 is close to 1, the final optical flow field is very close to the initial optical flow field. In this case, the optical flow field is more "noisy", but the boundaries of moving object can be more accurate.

The above method described in FIG. 7 and FIG. 8 is not unique in smoothing the initial optical flow motion field. Other motion fields smoothing techniques can also be used.

Figure 9:
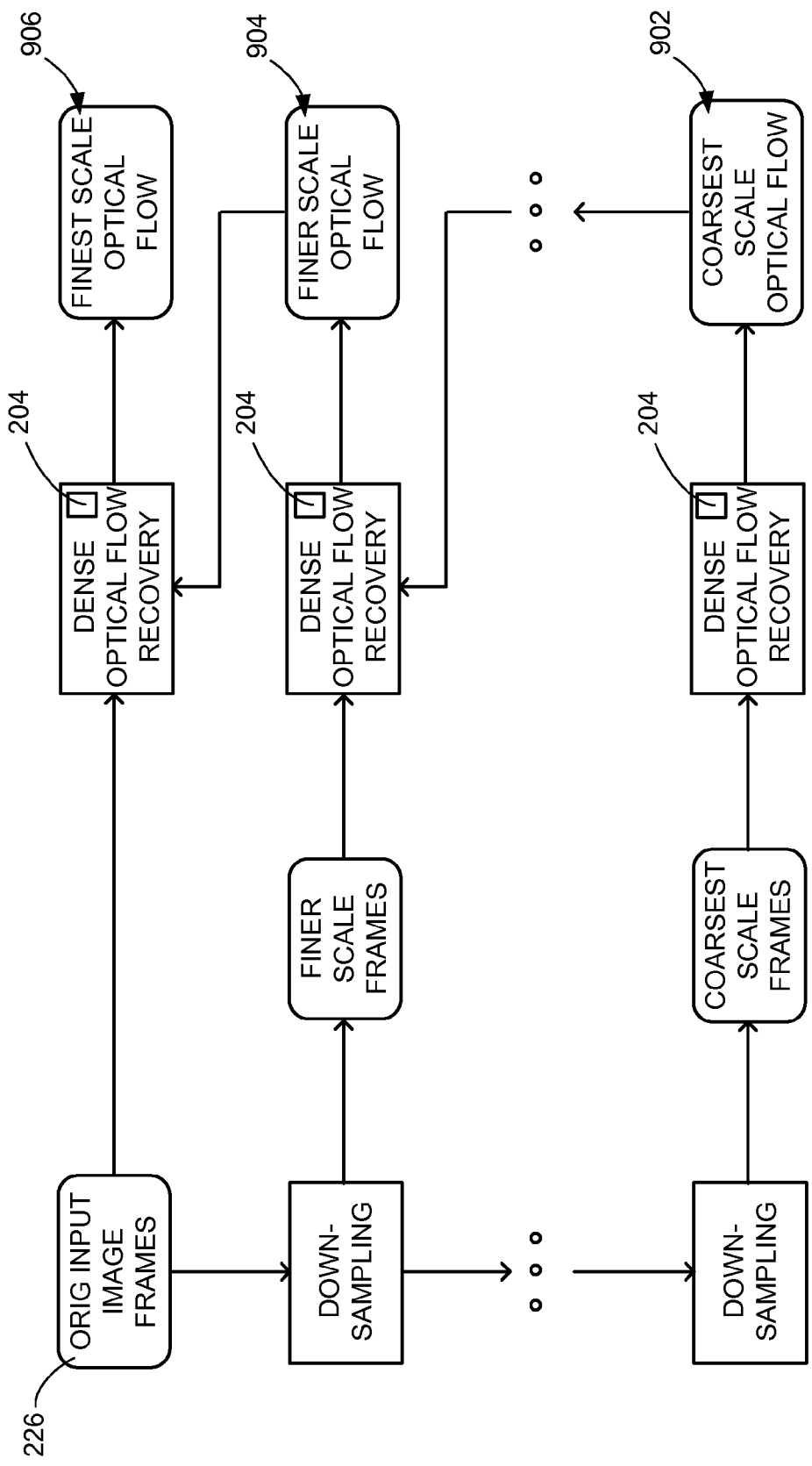
FIG. 9 is a detailed block diagram illustrating a multi-scale approach to recover the dense optical flow field of FIG. 2.

Referring now to FIG. 9, therein is shown a detailed block diagram illustrating a multi-scale approach to recover the dense optical flow field 204 of FIG. 2. The multi-scale approach can further expedite the computation of an optical flow field. The original input image frames 226, generally of high resolution, can be first down-sampled for several times. For each time that a down-sampling is performed, the resulting image frames 226 have smaller sizes and lower resolutions.

The image frames 226 with the lowest resolution (or the smallest size) are considered at a coarsest scale 902. The image frames 226 with a higher resolution (or a larger size) are considered at a finer scale 904. The original input image frames 226 have the highest resolution (or the largest size) and are considered at a finest scale 906. The image frames 226 with the coarser scale can be a down-sampled frame of a higher resolution frame with the finer scale 904.

For example, the original input image frames 226 can include a 4K image. After a 2×2 down-sampling, a high-definition (HD) image frame of size 1920×1080 pixels can be obtained. The HD image frame can be furthered down-sampled to an image frame of size 960×540 pixels. In this case, 4K frames can be used for the finest scale 906, HD frames can be used for the finer scale 904, and the frames of size 960×540 can be used for the coarsest scale 902.

After image down-sampling is completed, the optical flow field at the coarsest scale 902 of the image frames is first being calculated. The recovery process of such optical flow field is as described in FIGS. 2-8. In other words, the reliable edge motion vectors 302 of FIG. 3 are detected and the motion vector list 224 of FIG. 2 is created. Then, the recovery of the dense optical flow field 204 continues with the frame segmentations 601 of FIG. 6 to generate the image segments 226, an initial motion assignment by assigning the initial motion vector 228 of FIG. 2 to one of the image segments 226, and then a motion smoothing process to generate the smooth motion vector 230 of FIG. 2.

Once the dense optical flow field 204 is obtained for the coarsest scale 902, repeat the same process for the finer scale 904 based on already obtained information from the coarser scale. The same process can be repeated again until the finest scale 906 of the optical flow field is obtained.

Utilizing the information from the optical flow field at the coarser scale reduces the search scopes in the reliable edge motion vector detection, the initial motion generation and the smooth motion generation during the process of recovering the optical flow field at the finer scale 904. Due to the smaller search scopes, less calculation is needed in the multi-scale approach to recover the optical flow field at the finer scale 904 or the finest scale 906 compared to the case when the optical flow motion filed at the finer scale 904 or the finest scale 906 is recovered directly. Therefore, recovering the optical flow motion field at the finer scale 904 or the finest scale 906 based on the already obtained optical flow motion field from the coarsest scale 902 improves performance. FIG. 9 is shown just for illustrating purposes and other type of multi-scale approach to recover an optical flow field for high-resolution input image frames or the original input image frames 226 can be used.

It has also been found that the dense optical flow field 204 has many important applications. However, there are no existing algorithms with both high-quality and computational efficiency as described by the embodiments.

It has further been found that the embodiments provide a computationally efficient dense optical flow algorithm based on the image segmentation unit 212 of FIG. 2 and extraction of the dominant motion vectors 222 of FIG. 2.

It has further been found that the edge motion vectors 220 of FIG. 2 is further extended to the multi-scale approach with the coarsest scale 902, the finer scale 904, and the finest scale 906 to improve performance while maintaining quality.

It has further been found that the edge motion vectors 220 with a number of the values of 2 or more of the scales incorporate the complicated motions that the translational movements do not address.

Figure 10:
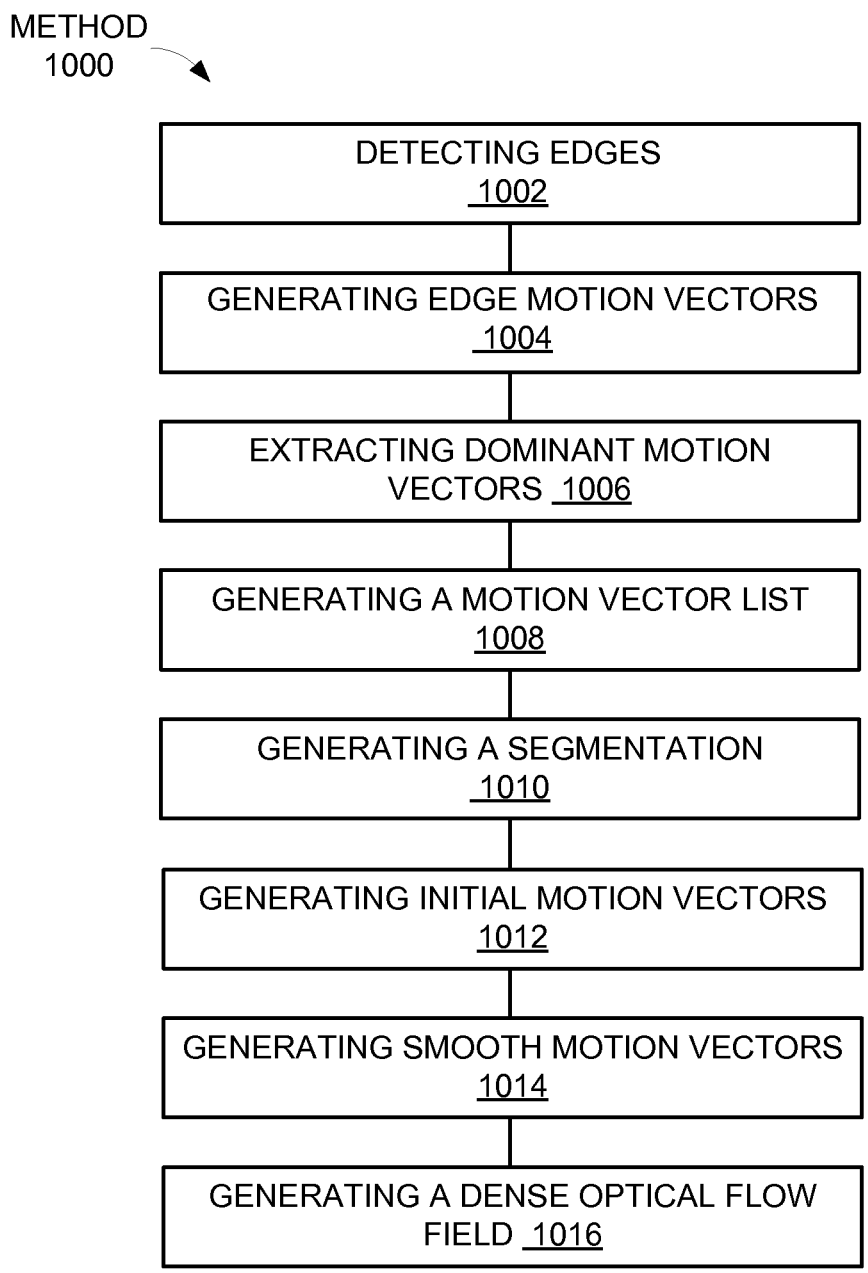
FIG. 10 is a flow chart of a method of operation of an image processing system in a further embodiment of the present invention.

Referring now to FIG. 10, therein is shown a flow chart of a method 1000 of operation of an image processing system in a further embodiment of the present invention. The method 1000 includes: detecting edges in a first image frame and a second image frame stored by a storage device or a memory in a block 1002; generating edge motion vectors between the first image frame and the second image frame based on the edges in a block 1004; extracting dominant motion vectors from a group of the edge motion vectors in a block 1006; generating a motion vector list based on the dominant motion vectors in a block 1008; generating a segmentation of the first image frame in a block 1010; generating initial motion vectors based on the segmentation and the motion vector list in a block 1012; generating smooth motion vectors based on the initial motion vectors in a block 1014; and generating a dense optical flow field by combining the smooth motion vectors in a block 1016.

Thus, it has been discovered that the image processing system 100 of FIG. 1 of the embodiments of the present invention furnish important and heretofore unknown and unavailable solutions, capabilities, and functional aspects for an image processing system with an optical flow recovery mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   detecting edges in a first image frame and a second image frame stored by a storage device or a memory;
   generating edge motion vectors between the first image frame and the second image frame based on the edges;
   extracting dominant motion vectors from a group of the edge motion vectors;
   generating a motion vector list based on the dominant motion vectors;
   generating a segmentation of the first image frame;
   generating initial motion vectors based on the segmentation and the motion vector list;
   generating smooth motion vectors based on the initial motion vectors; and
   generating a dense optical flow field by combining the smooth motion vectors.

2. The method as claimed in claim 1 wherein generating the initial motion vectors includes generating the initial motion vectors for image segments instead of individual pixels.

3. The method as claimed in claim 1 further comprising detecting a backward similar region in the first image frame by a backward motion search to determine an unreliable edge motion.

4. The method as claimed in claim 1 wherein generating the smooth motion vectors includes generating the smooth motion vectors based on a multiplier and the initial motion vectors.

5. The method as claimed in claim 1 further comprising:
   generating the first image frame by down-sampling an original image frame having a finer scale; and
   wherein:
   detecting the edges includes detecting the edges in the first image frame having a coarsest scale with a resolution smaller than the finer scale of the original image frame.

6. A method of operation of an image processing system comprising:
   detecting edges in a first image frame and a second image frame stored by a storage device or a memory;
   generating edge motion vectors between the first image frame and the second image frame based on the edges;
   extracting dominant motion vectors from a group of the edge motion vectors;

generating a motion vector list based on the dominant motion vectors;

generating a segmentation to generate image segments in the first image frame;

generating initial motion vectors based on the segmentation and the motion vector list;

generating smooth motion vectors based on the initial motion vectors; and generating a dense optical flow field by combining the smooth motion vectors.

7. The method as claimed in claim 6 wherein generating the initial motion vectors includes generating the initial motion vectors for the image segments instead of individual pixels, the image segments generated based on luminance, chrominance, or texture of the first image frame.

8. The method as claimed in claim 6 further comprising:
detecting a backward similar region in the first image frame by a backward motion search to determine an unreliable edge motion; and
calculating the dominant motion vectors based on the backward similar region and reliable edge motion vectors.

9. The method as claimed in claim 6 further comprising:
generating an initial similarity distance with the image segments transformed by the initial motion vectors; and
generating a neighbor similarity distance with the image segments transformed by a neighbor motion vector, the neighbor motion vector generated based on a shared boundary of the image segments; and
wherein:
generating the smooth motion vectors includes generating the smooth motion vectors by comparing the neighbor similarity distance and a product of a multiplier and the initial motion vectors with the multiplier greater than one.

10. The method as claimed in claim 6 further comprising:
generating the first image frame by down-sampling an original image frame having a finer scale; and
wherein:
detecting the edges includes detecting the edges in the first image frame having a coarsest scale with a resolution smaller than the finer scale of the original image frame; and
generating the edge motion vectors includes generating the edge motion vectors based on the edges, the edge motion vectors having at least two values.

11. An image processing system comprising:
an edge motion generation unit for detecting edges in a first image frame and a second image frame stored by a storage device or a memory and for generating edge motion vectors between the first image frame and the second image frame based on the edges;
a motion vector list generation unit for extracting dominant motion vectors from a group of the edge motion vectors and for generating a motion vector list based on the dominant motion vectors;
an image segmentation unit for generating a segmentation of the first image frame;
an initial motion generation unit for generating initial motion vectors based on the segmentation and the motion vector list; and
a smooth motion generation unit for generating smooth motion vectors based on the initial motion vectors and for generating a dense optical flow field by combining the smooth motion vectors.

12. The system as claimed in claim 11 wherein the initial motion generation unit is for generating the initial motion vectors for image segments instead of individual pixels.

13. The system as claimed in claim 11 wherein the edge motion generation unit is for detecting a backward similar region in the first image frame by a backward motion search to determine an unreliable edge motion.

14. The system as claimed in claim 11 wherein the smooth motion generation unit is for generating the smooth motion vectors based on a multiplier and the initial motion vectors.

15. The system as claimed in claim 11 wherein the edge motion generation unit is for generating the first image frame by down-sampling an original image frame having a finer scale and for detecting the edges in the first image frame having a coarsest scale with a resolution smaller than the finer scale of the original image frame.

16. The system as claimed in claim 11 wherein the image segmentation unit is for generating the segmentation to generate image segments in the first image frame.

17. The system as claimed in claim 16 wherein the initial motion generation unit is for generating the initial motion vectors for the image segments instead of individual pixels, the image segments generated based on luminance, chrominance, or texture of the first image frame.

18. The system as claimed in claim 16 wherein:
the edge motion generation unit is for detecting a backward similar region in the first image frame by a backward motion search to determine an unreliable edge motion; and
the motion vector list generation unit is for calculating the dominant motion vectors based on the backward similar region and reliable edge motion vectors.

19. The system as claimed in claim 16 wherein the smooth motion generation unit is for generating an initial similarity distance with the image segments transformed by the initial motion vectors, for generating a neighbor similarity distance with the image segments transformed by a neighbor motion vector, the neighbor motion vector generated based on a shared boundary of the image segments, and for generating the smooth motion vectors by comparing the neighbor similarity distance and a product of a multiplier and the initial motion vectors with the multiplier greater than one.

20. The system as claimed in claim 16 wherein:
the edge motion generation unit is for generating the first image frame by down-sampling an original image frame having a finer scale and for detecting the edges in the first image frame having a coarsest scale with a resolution smaller than the finer scale of the original image frame; and
the motion vector list generation unit is for generating the edge motion vectors based on the edges, the edge motion vectors having at least two values.

* * * * *